(12) United States Patent
Lee et al.

(10) Patent No.: US 7,746,429 B2
(45) Date of Patent: Jun. 29, 2010

(54) LIQUID CRYSTAL DISPLAY PANEL

(75) Inventors: Hao-Chieh Lee, Hsinchu (TW); Ming-Hung Shih, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 835 days.

(21) Appl. No.: 11/563,209

(22) Filed: Nov. 26, 2006

(65) Prior Publication Data

US 2008/0094562 A1    Apr. 24, 2008

(30) Foreign Application Priority Data

Oct. 19, 2006    (TW) ............................... 95138535 A

(51) Int. Cl.
*G02F 1/1333*    (2006.01)

(52) U.S. Cl. ...................... 349/111; 385/110

(58) Field of Classification Search ................ 349/110, 349/153; 319/111
See application file for complete search history.

(56) References Cited

U.S. PATENT DOCUMENTS 6,954,242 B2    10/2005    Youn et al.
7,006,178 B2 *  2/2006    Lee et al. ..................... 349/110
2003/0179328 A1  9/2003    Manabe et al.
2004/0075801 A1  4/2004    Choi et al.

FOREIGN PATENT DOCUMENTS

CN    1161464    10/1997

* cited by examiner

*Primary Examiner*—Sarah Song
(74) *Attorney, Agent, or Firm*—Jianq Chyun IP Office

(57) ABSTRACT

A liquid crystal display (LCD) panel including a thin film transistor (TFT) array substrate, a color filter substrate, a sealant, and a liquid crystal layer is provided. The TFT array substrate includes a substrate, a plurality of pixel structures, a plurality of scan lines, a plurality of data lines, and a light-shielding pattern. The scan lines and data lines are disposed on the substrate for controlling the operation of the pixel structures. The light-shielding pattern arranged on the periphery of the panel traverses the scan lines and data lines and is electrically insulated from the scan lines and data lines. The sealant is sandwiched between the TFT array substrate and the color filter substrate and is corresponding to the light-shielding pattern. The liquid crystal layer is disposed between the TFT array substrate, the color filter substrate, and the sealant.

16 Claims, 11 Drawing Sheets

LIQUID CRYSTAL DISPLAY PANEL

CROSS-REFERENCE TO RELATED APPLICATION

This application claims the priority benefit of Taiwan application Ser. No. 95138535, filed Oct. 19, 2006. All disclosure of the Taiwan application is incorporated herein by reference.

BACKGROUND OF THE INVENTION

1. Field of the Invention

The present invention relates to a liquid crystal display (LCD) panel. More particularly, the present invention relates to a LCD panel with a light-shielding pattern disposed at the periphery of the panel.

2. Description of Related Art

The rapid advancement in semiconductor devices and display apparatuses brings the rapid advancement of a multimedia society. As to display panels, thin film transistor liquid crystal display (TFT LCD) has become the leading product in display market due to its characteristics such as high image quality, high space efficiency, low power consumption, and no radiation.

Generally speaking, a TFT LCD is composed of a TFT array substrate, a color filter substrate, and a liquid crystal layer sandwiched between the two substrates. The surface of the TFT array substrate has a plurality of pixel regions arranged as an array, and each of the pixel regions contains a TFT and a pixel electrode for controlling the rotations of the liquid crystal molecules in the pixel region so that each of the pixels can produce grey scale of different color.

LCD panels can be categorized into vacuum injection and one drop fill (ODF) according to the injection of liquid crystal molecules. According to vacuum injection, first a TFT array substrate and a color filter substrate are assembled and an opening is left for injecting liquid crystal; the chamber of the liquid crystal injection apparatus and the space between the two substrates is then vacuumed and the liquid crystal injection opening is immersed in the liquid crystal, release the vacuum of the chamber, so that the liquid crystal is injected into the space between the two substrates by the pressure difference. According to ODF, first a pattern of sealant is dispensed on the periphery of the TFT array substrate and the liquid crystal are dropped into the display region of the TFT array substrate; after that, the TFT array substrate and the color filter substrate are assembled in a vacuum chamber; finally, the sealant is radiated and hardened by a ultraviolet. Compared to vacuum injection, ODF can reduce the time for injecting liquid crystal and the quantity of the liquid crystal; thus, presently ODF is generally used for injecting liquid crystal in large-size LCD panels.

FIG. 1A is partial cross-sectional view of a conventional liquid crystal display (LCD) panel fabricated through one drop fill (ODF). Referring to FIG. 1A, the LCD panel 100 includes a TFT array substrate 110, a color filter substrate 120, and a liquid crystal layer 130. The color filter substrate 120 is disposed above the TFT array substrate 110 in parallel, and the liquid crystal layer 130 is sandwiched between the TFT array substrate 110 and the color filter substrate 120. The LCD panel 100 is divided into a display region 100a and a sealant region 100b. The display region 100a is the part for displaying images. A sealant 140 is disposed in the sealant region 100b for bonding the TFT array substrate 110 and the color filter substrate 120. Generally speaking, the sealant 140 is formed by an ultraviolet curing adhesive, thus, the sealant 140 can only bond and fix the TFT array substrate 110 and the color filter substrate 120 after it is radiated and hardened by an ultraviolet light. If the sealant 140 is not completely hardened, it may contaminate those liquid crystal molecules in contact and may further affect the display quality thereof.

FIG. 1B is vertical view of the LCD panel in FIG. 1A. Referring to FIG. 1B, a plurality of scan lines 112 and data lines 114 perpendicular to each other are disposed on the TFT array substrate 110 of the LCD panel 100 for defining a plurality of pixel regions P arranged as an array in the display region 110a. Each pixel region P contains a pixel structure 116. Each pixel structure 116 includes a TFT 117 and a pixel electrode 118 electrically connected to the TFT 117 for controlling the on/off of the pixel through the TFT 117. Each TFT 117 includes a gate 117a, a source 117b, and a drain 117c. Wherein the gate 117a is electrically connected to the corresponding scan line 112, the source 117b is electrically connected to the corresponding data line 114, and the drain 117c is electrically connected to the pixel electrode 118 via a contact hole. One ends of the scan lines 112 and data lines 114 are extended to the periphery of the sealant region 110b and are respectively connected to a gate driver IC (not shown) and a source driver IC (not shown) so that each pixel can produce grey scale of different color.

However, when the LCD panel 100 has been assembled and put into operation, the light provided by a backlight module (not shown) disposed under the LCD panel 100 passes through the spaces between the scan lines 112 and the spaces between the data lines 114 in the sealant region 110b, and which causes light leakage at the periphery of the LCD panel 100.

To resolve the foregoing problem of light leakage at the periphery of the LCD panel, referring to FIG. 2, a plurality of floating metals 119 are disposed under the sealant 140 for light shielding. However, the floating metals 119 may cause residual charges due to capacitance coupling and which may further cause ESD damage, thus, the quality of the panel may be reduced. Besides, uneven capacitance coupling may reduce the signal consistence of the panel and may cause other parasitic effect.

SUMMARY OF THE INVENTION

Accordingly, the present invention is directed to provide a liquid crystal display (LCD) panel, wherein a light-shielding pattern traversing scan lines and data lines is disposed at the periphery of the LCD panel so as to prevent light leakage at the periphery of the LCD panel and electro-static discharge (ESD) caused by floating metals adopted in conventional techniques.

To achieve the aforementioned and other objectives, the present invention provides a LCD panel. The LCD panel includes a thin film transistor (TFT) array substrate, a color filter substrate, a sealant, and a liquid crystal layer. The TFT array substrate includes a substrate, a plurality of pixel structures, a plurality of scan lines, a plurality of data lines, and a light-shielding pattern. The substrate has a display region and a sealant region surrounding the display region. The pixel structures are disposed on the display region of the substrate. The scan lines are disposed on the substrate. The data lines are disposed on the substrate, and the scan lines and the data lines are used for controlling the pixel structures. The light-shielding pattern disposed within the sealant region traverses the scan lines and the data lines and is electrically insulated from the scan lines and the data lines. The sealant is disposed between the TFT array substrate and the color filter substrate and is corresponding to the light-shielding pattern. The liquid crystal layer is disposed between the color filter substrate, the TFT array substrate, and the sealant.

According to an embodiment of the present invention, each of the pixel structures includes a TFT and a pixel electrode. The TFT is electrically connected to one of the scan lines and one of the data lines. The pixel electrode is electrically connected to the TFT.

According to an embodiment of the present invention, the sealant is composed of an ultraviolet curing adhesive.

According to an embodiment of the present invention, the TFT array substrate further includes a plurality of common lines, wherein the common lines and the scan lines are alternatively disposed on the substrate in parallel, and the light-shielding pattern is electrically connected to the common lines.

According to an embodiment of the present invention, the light-shielding pattern is electrically connected to a ground terminal.

According to an embodiment of the present invention, the light-shielding pattern is composed of a metal material or a non-transparent conductive material.

According to an embodiment of the present invention, the sealant is located above the light-shielding pattern.

According to an embodiment of the present invention, the sealant partially overlaps with the light-shielding pattern.

According to an embodiment of the present invention, the light-shielding pattern includes a first light-shielding pattern and a second light-shielding pattern. The first light-shielding pattern traverses the data lines, and the second light-shielding pattern traverses the scan lines.

According to an embodiment of the present invention, the data lines are located between the first light-shielding pattern and the substrate. Besides, the TFT array substrate has an insulation layer disposed between the data lines and the first light-shielding pattern.

According to an embodiment of the present invention, the first light-shielding pattern is located between the data lines and the substrate. Besides, the TFT array substrate has an insulation layer disposed between the data lines and the first light-shielding pattern.

According to an embodiment of the present invention, the scan lines are located between the second light-shielding pattern and the substrate. Besides, the TFT array substrate has an insulation layer disposed between the scan lines and the second light-shielding pattern.

According to an embodiment of the present invention, the second light-shielding pattern is located between the scan lines and the substrate. Besides, the TFT array substrate has an insulation layer disposed between the scan lines and the second light-shielding pattern.

According to an embodiment of the present invention, the TFT array substrate further includes a plurality of common lines, wherein the common lines and the scan lines are alternatively disposed on the substrate in parallel, and the first light-shielding pattern and the second light-shielding pattern are electrically connected to the common lines.

According to an embodiment of the present invention, the first light-shielding pattern and the second light-shielding pattern are electrically connected to a ground terminal.

In overview, according to the LCD panel in the present invention, a light-shielding pattern traversing scan lines and data lines is disposed on a TFT array substrate for preventing light leakage at the periphery of the LCD panel and ESD caused by floating metals adopted in conventional techniques. Moreover, the light-shielding pattern can be electrically connected to common lines or a ground terminal to change the voltages for adjusting capacitance coupling all together, so that ESD damage and inconsistence of capacitance coupling between signal lines can be reduced.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
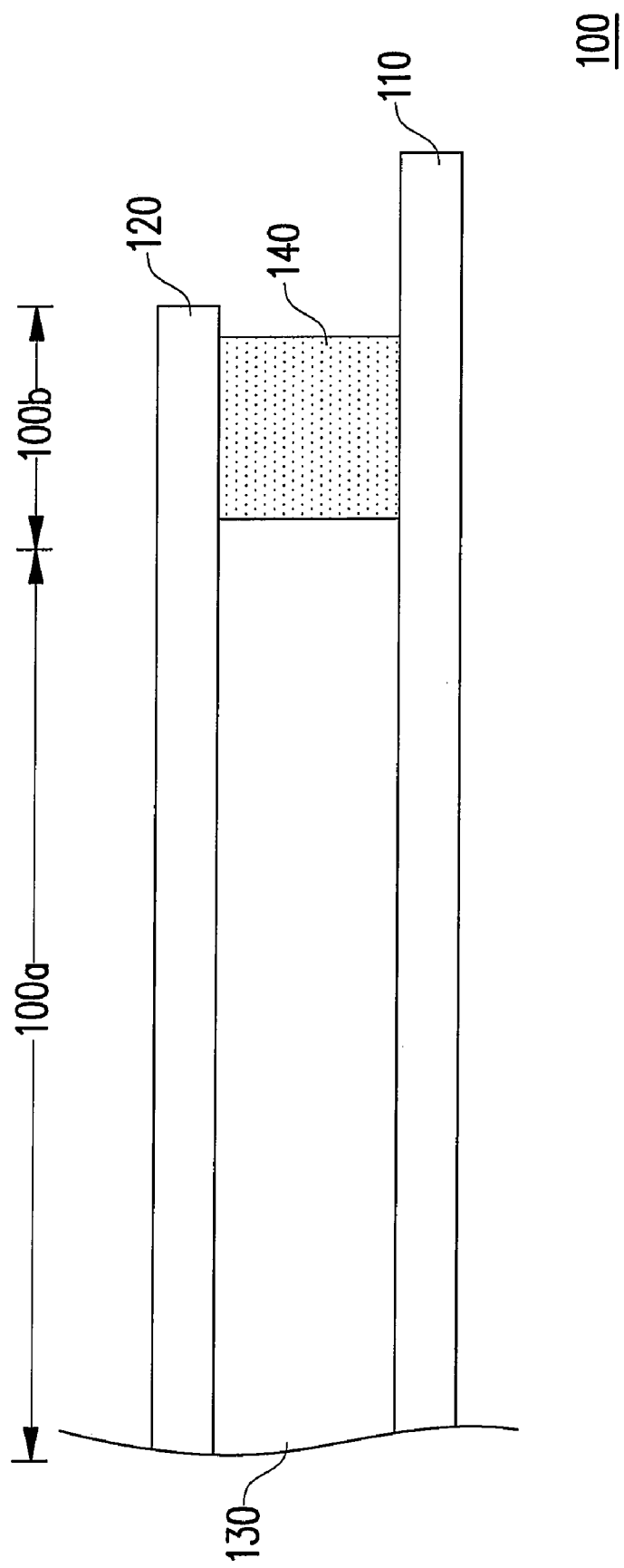
FIG. 1A is partial cross-sectional view of a conventional liquid crystal display (LCD) panel fabricated through one drop fill (ODF).
Figure 1B:
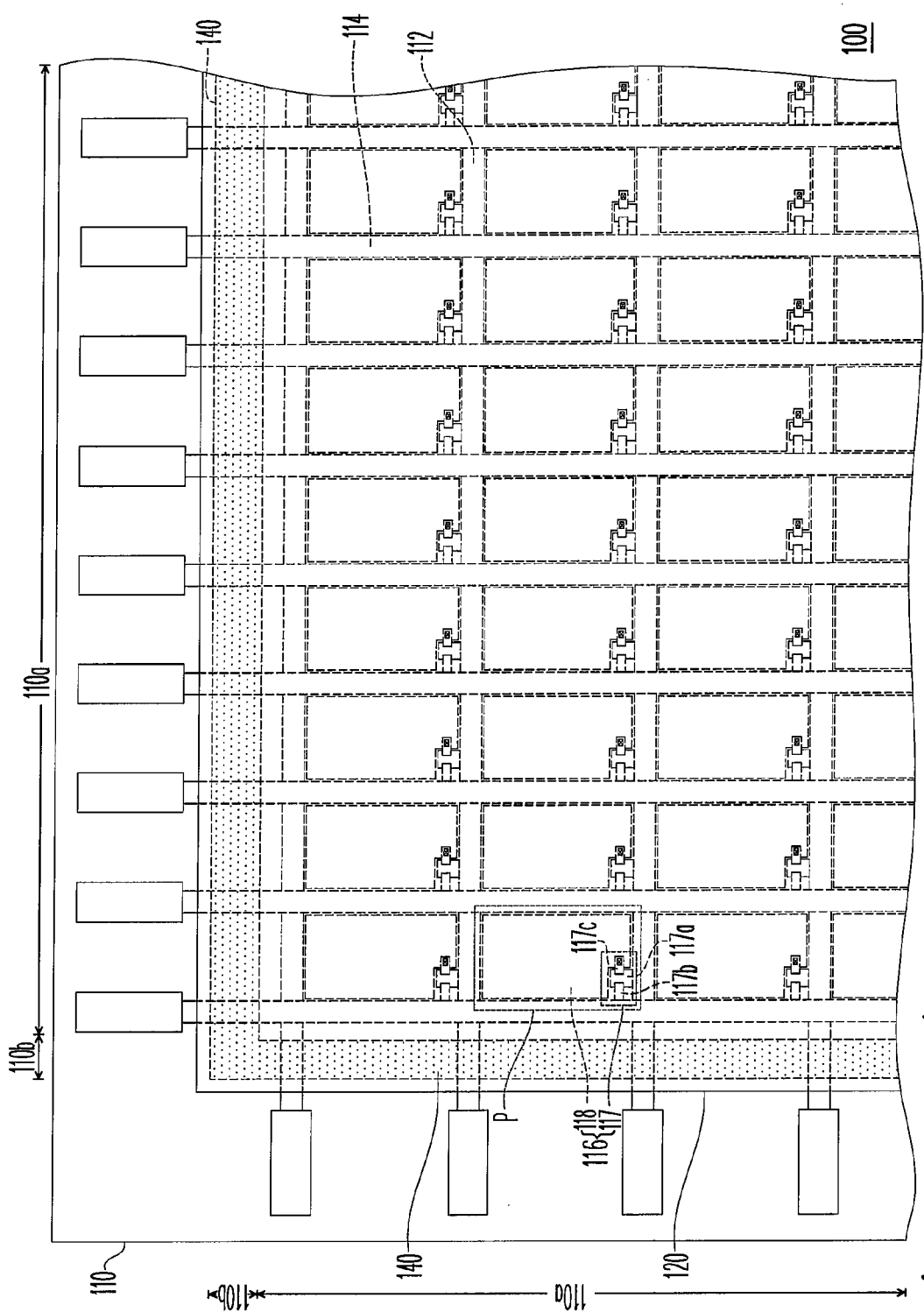
FIG. 1B is vertical view of the LCD panel in FIG. 1A.
Figure 2:
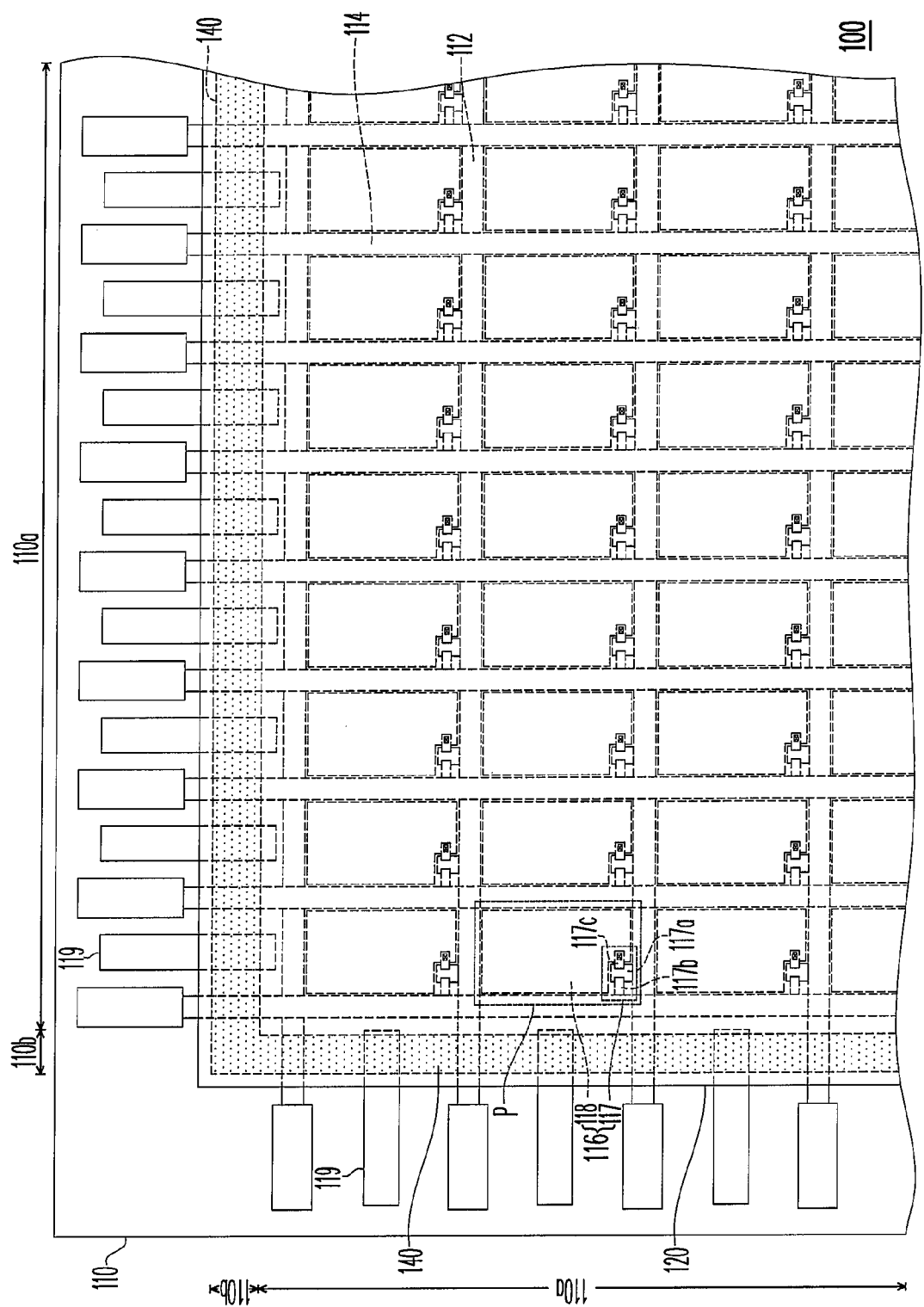
FIG. 2 is a vertical view of another conventional LCD panel.
Figure 3A:
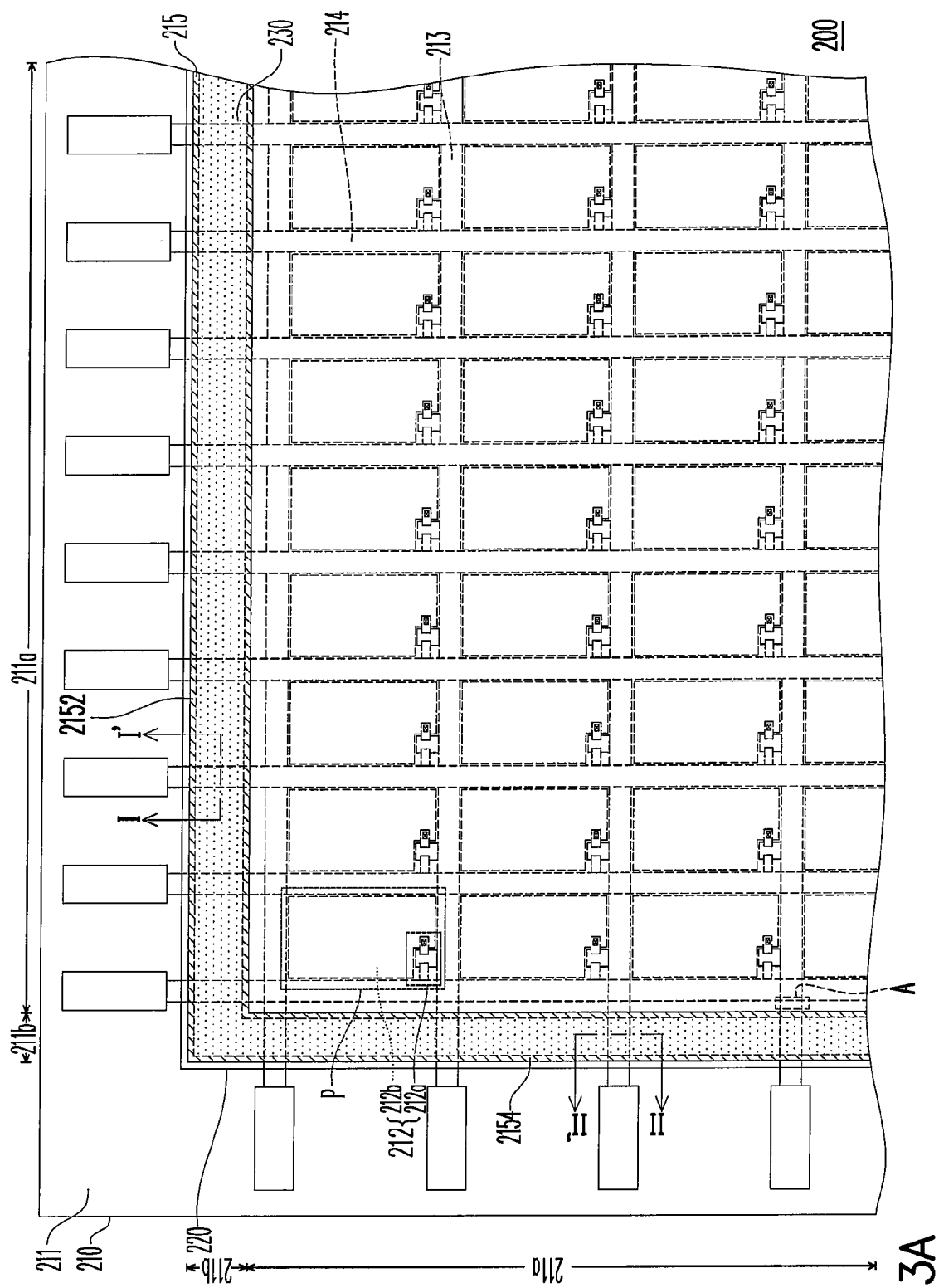
FIG. 3A is a vertical view of a LCD panel according to the first embodiment of the present invention.
Figure 3B:
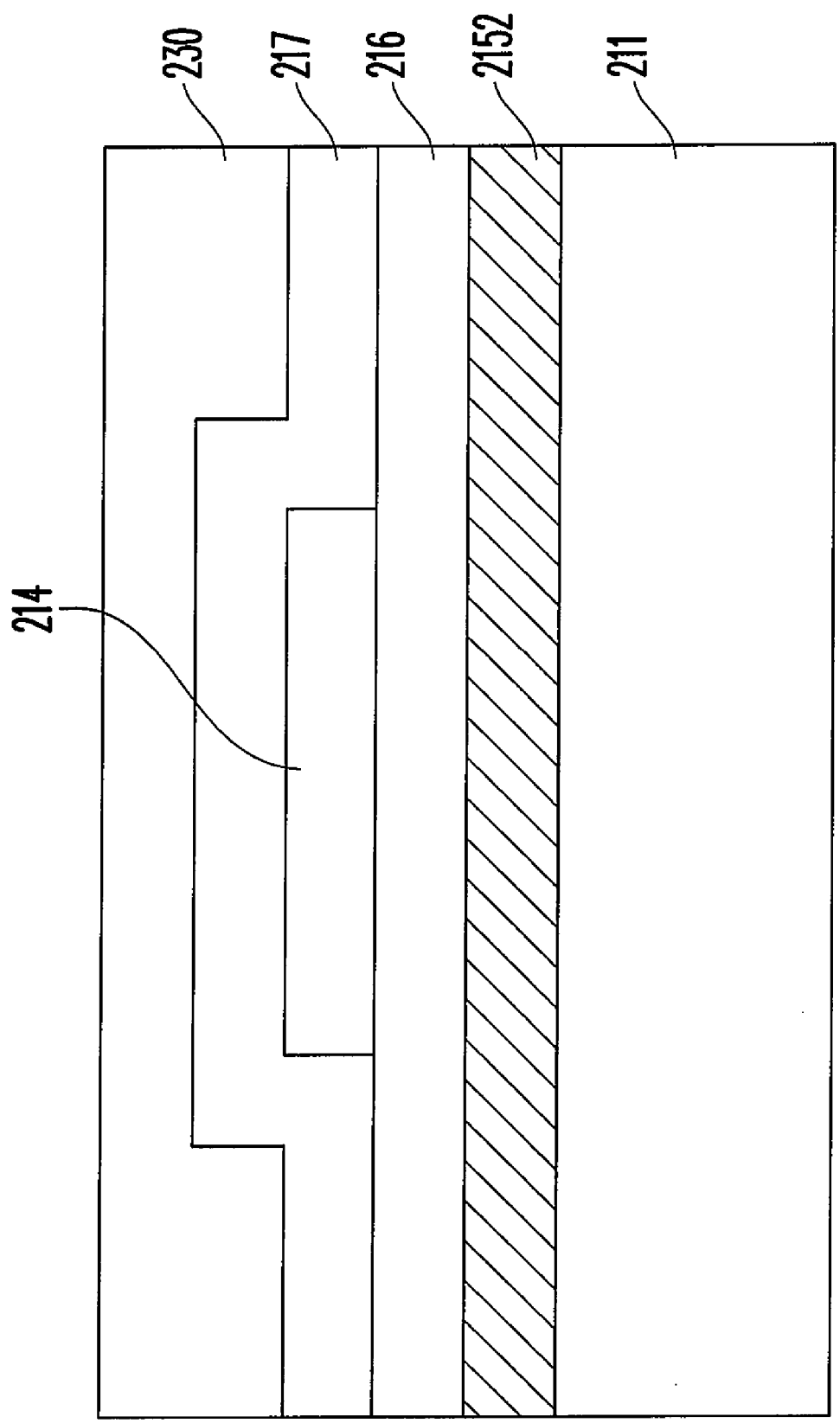
FIG. 3B is a cross-sectional view of the thin film transistor (TFT) array substrate and sealant in FIG. 3A cut along line I-I'.
Figure 3C:
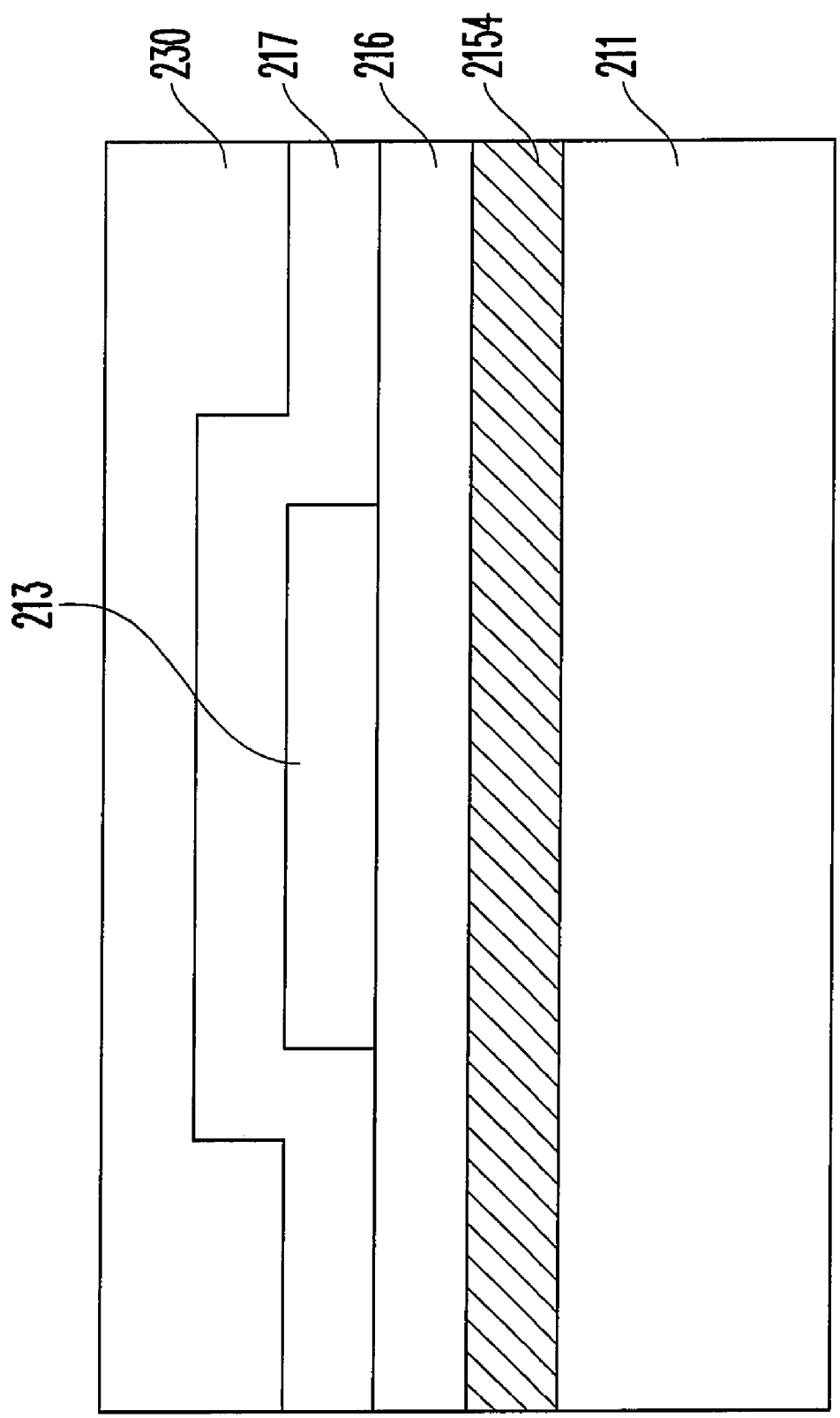
FIG. 3C is a cross-sectional view of the TFT array substrate and sealant in FIG. 3A cut along line II-II'.

FIG. 3A is a vertical view of a liquid crystal display (LCD) panel according to the first embodiment of the present invention. FIG. 3B is a cross-sectional view of the thin film transistor (TFT) array substrate and sealant in FIG. 3A cut along line I-I'. FIG. 3C is a cross-sectional view of the TFT array substrate and sealant in FIG. 3A cut along line II-II'. Referring to FIG. 3A first, the LCD panel 200 includes a TFT array substrate 210, a color filter substrate 220, a sealant 230, and a liquid crystal layer (not shown). The color filter substrate 220 is disposed above the TFT array substrate 210. The sealant 230 is disposed between the TFT array substrate 210 and the color filter substrate 220. The liquid crystal layer (not shown) is disposed between the TFT array substrate 210, the color filter substrate 220, and the sealant 230.

The TFT array substrate 210 includes a substrate 211, a plurality of pixel structures 212, a plurality of scan lines 213, a plurality of data lines 214, and a light-shielding pattern 215. The substrate 211 is divided into a display region 211a of the LCD panel and a sealant region 211b surrounding the display region 211a. The sealant 230 is disposed within the sealant region 211b. The scan lines 213 and the data lines 214 are alternatively disposed on the substrate 211 to define a plurality of pixel regions P arranged as an array in the display region 211a. Each of the pixel regions P contains a pixel structure 212, and each of the pixel structures 212 includes a TFT 212a and a pixel electrode 212b electrically connected to the TFT 212a. The TFT 212a is electrically connected to the corresponding scan line 213 and data line 214 for controlling the operation of the pixel structure 212 through the scan line 213 and the data line 214.

The light-shielding pattern 215 is located within the sealant region 211b and traverses all the scan lines 213 and data lines 214 so that light leakage between the signal lines and possible ESD damage caused by floating metals in conventional techniques can be prevented, and the best light-shielding effect can be achieved. Furthermore, referring to FIGS. 3A, 3B, and 3C, in the present embodiment, the entire light-shielding pattern 215 is made of a first metal layer in TFT fabrication process; the scan lines 213 and data lines 214 in the sealant region 211b are made of a second metal layer in TFT fabrication process; and the sealant 230 is located above the light-shielding pattern 215 for bonding the TFT array substrate 210 and the color filter substrate 220, wherein the sealant 230 is composed of a ultraviolet curing adhesive.

Figure 3D:
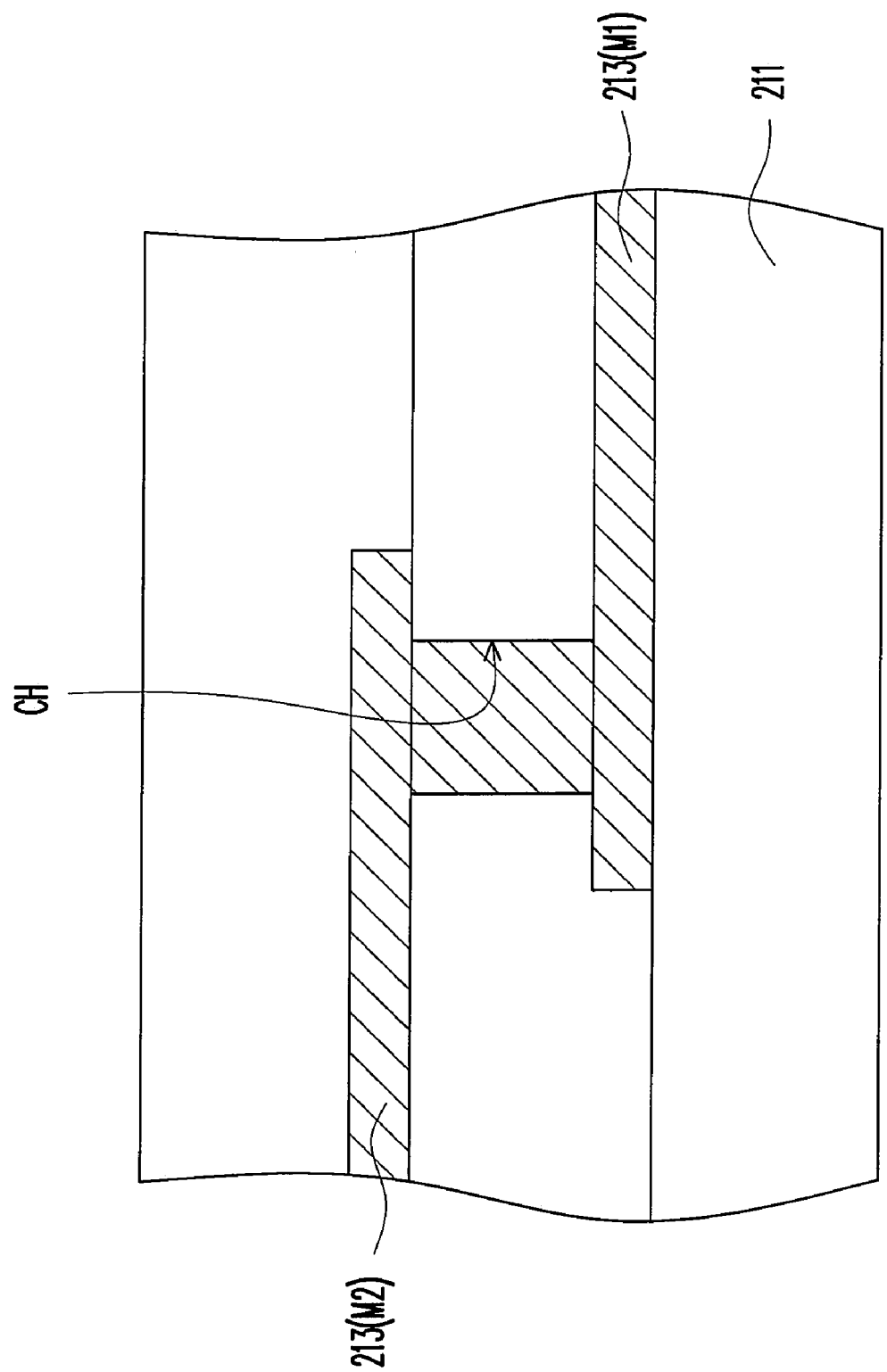
FIG. 3D is a cross-sectional view of the scan lines in FIG. 3A within region A.

FIG. 3D is a cross-sectional view of the scan lines in FIG. 3A within region A. Referring to FIG. 3D, generally speaking, the scan lines 213 in the display region 211a are made of the first metal layer M1. While in the present embodiment, the scan lines 213 in the sealant region 211b are made of the second metal layer M2. Thus, the first and the second metal layer are electrically connected via a contact hole (CH) at the intersection of the sealant region 211b and the display region 211a so that a complete line structure is formed by the scan lines 213 in the display region 211a and the scan lines 213 in the sealant region 211b.

Referring to FIG. 3A again, the light-shielding pattern 215 includes a first light-shielding pattern 2152 and a second light-shielding pattern 2154 connected to one end of the first light-shielding pattern 2152. Wherein the first light-shielding pattern 2152 traverses all the data lines 214, and the second light-shielding pattern 2154 traverses all the scan lines 213. In the present embodiment, the light-shielding pattern 215 may be fabricated with metal material or non-transparent conductive material. In addition, a first insulation layer 216 (i.e. a gate insulation layer) is disposed on the light-shielding pattern 215 so that the first light-shielding pattern 2152 is electrically insulated from all the data lines 214 and the second light-shielding pattern 2154 is electrically insulated from all the scan lines 213. Moreover, a second insulation layer 217 is disposed on the scan lines 213 and data lines 214 for protecting the scan lines 213 and data lines 214 from being damaged or humidified and for electrically insulating the scan lines 213 and data lines 214 from components above the scan lines 213 and data lines 214.

The TFT array substrate 210 may further includes a plurality of common lines (not shown), and approximately, each common line is disposed between two adjacent scan lines 213. The light-shielding pattern 215 in the present invention may be electrically connected to the common lines or a ground terminal. Accordingly, the voltages for adjusting capacitance coupling can be changed all together to reduce ESD damage and inconsistence of capacitance coupling between signal lines.

In the present embodiment, the light-shielding pattern 215 is made of a first metal layer, while the scan lines 213 and data lines 214 in the sealant region 211b are made of a second metal layer. However, according to another embodiment of the present invention, the first metal layer may also be used for fabricating the scan lines 213 and data lines 214 and the second metal layer for fabricating the light-shielding pattern 215 according to the user's requirement since it is not limited in the present invention.

Figure 4A:
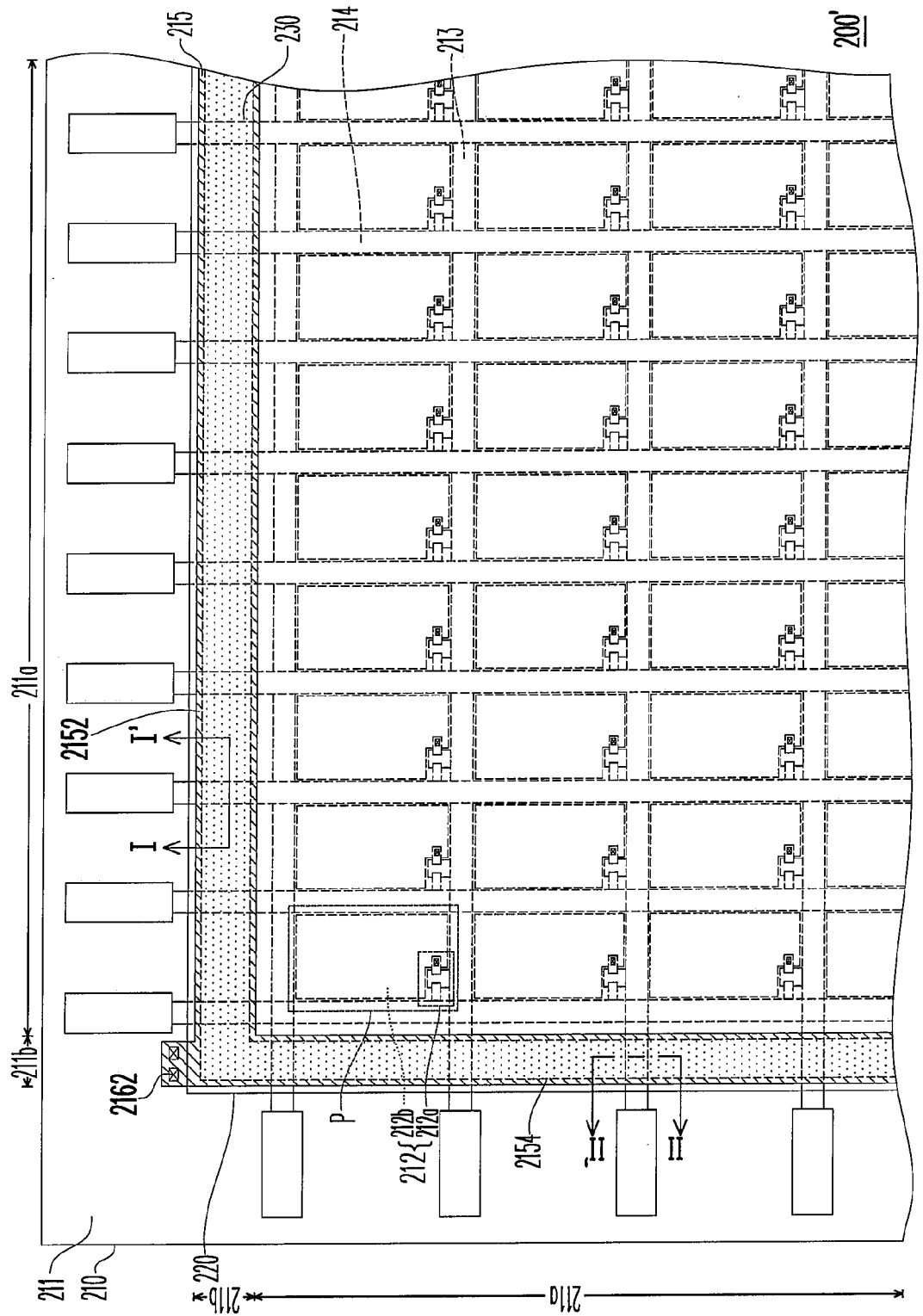
FIG. 4A is a vertical view of a LCD panel according to the second embodiment of the present invention.
Figure 4B:
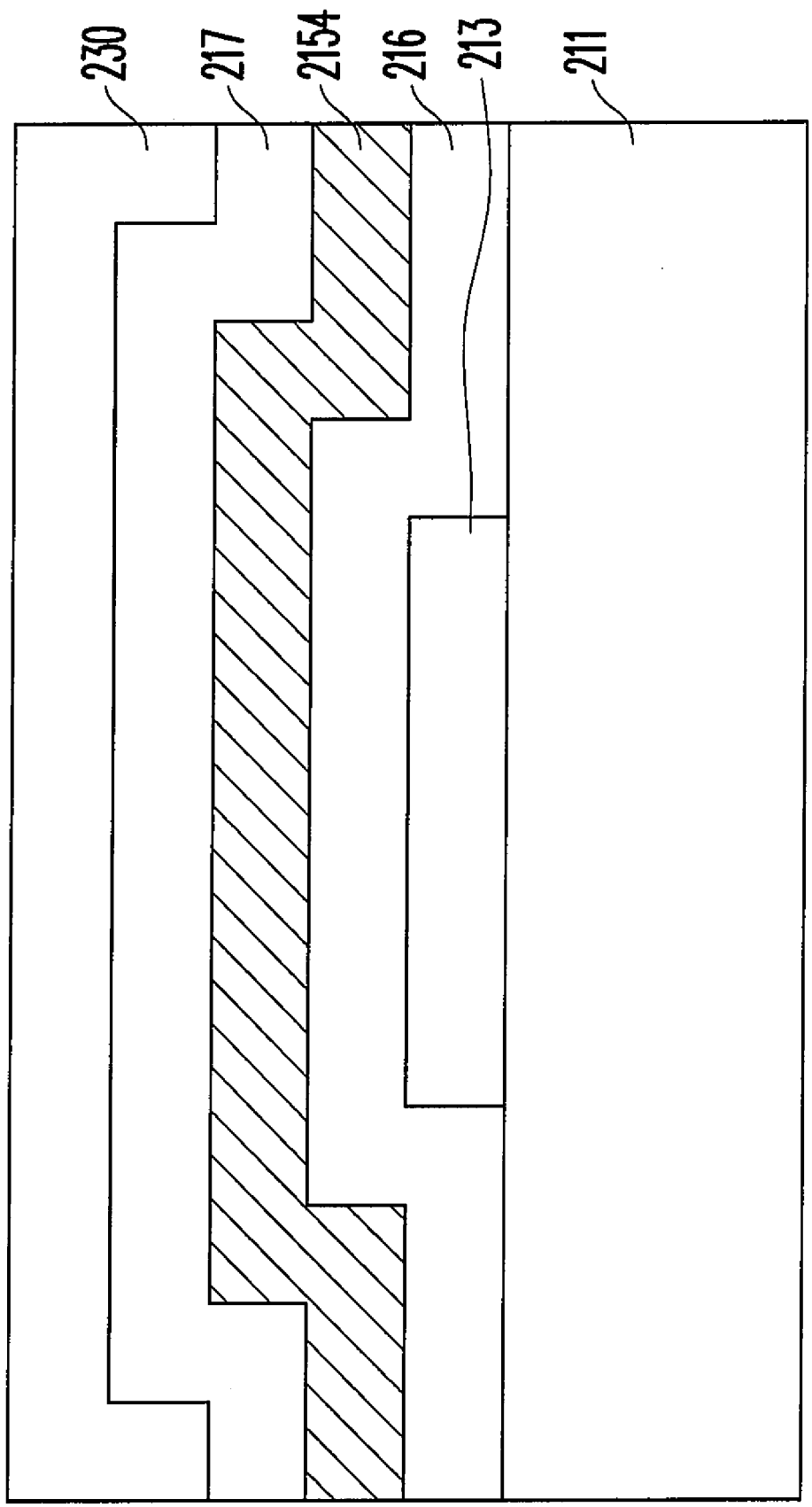
FIG. 4B is a cross-sectional view of the TFT array substrate and sealant in FIG. 4A cut along line II-II'.
Figure 4C:
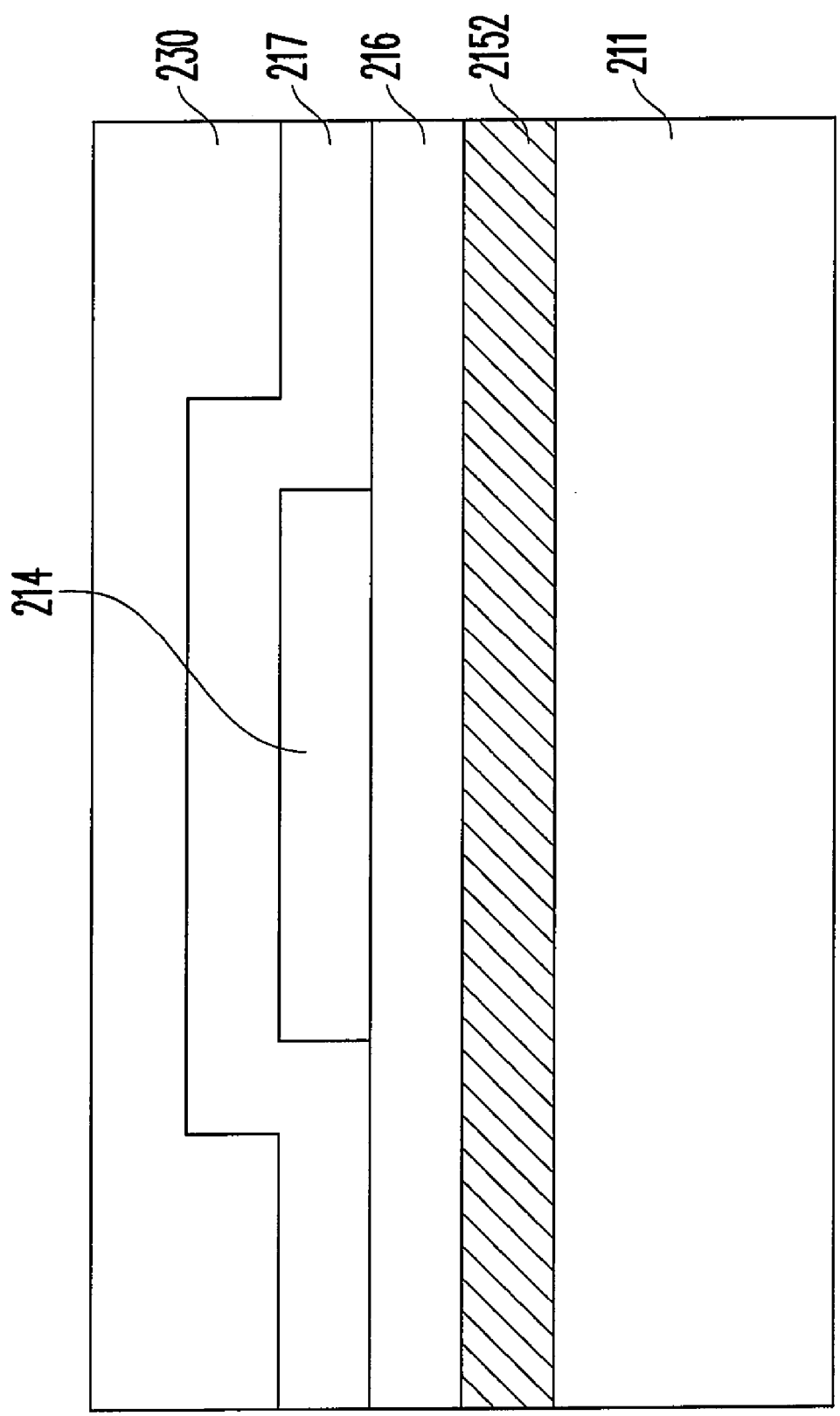
FIG. 4C is a cross-sectional view of the TFT array substrate and sealant in FIG. 4A cut along line I-I'.

FIG. 4A is a vertical view of a LCD panel according to the second embodiment of the present invention. FIG. 4B is a cross-sectional view of the TFT array substrate and sealant in FIG. 4A cut along line II-II'. FIG. 4C is a cross-sectional view of the TFT array substrate and sealant in FIG. 4A cut along line I-I'. Referring to FIGS. 4A, 4B, and 4C, the structure of the LCD panel 200' is approximately the same as that of the LCD panel 200 in FIG. 3A, and the difference between the two is that the scan lines 213 of the LCD panel 200' are made of the first metal layer and the data lines 214 from the second metal layer. Thus, the second light-shielding pattern 2154 traversing the scan lines 213 has to be made of the second metal layer so that the second light-shielding pattern 2154 can be electrically insulated from the scan lines 213. Similarly, the first light-shielding pattern 2152 traversing the data lines 214 has to be made of the first metal layer so that the first light-shielding pattern 2152 can be electrically insulated from the data lines 214. In the present embodiment, the first light-shielding pattern 2152 and the second light-shielding pattern 2154 may be electrically connected to the common lines or a ground terminal respectively. Besides, the first light-shielding pattern 2152 may also be electrically connected to the second light-shielding pattern 2154 via the contact hole 2162 in the first insulation layer 216, and then the light-shielding pattern 215 is electrically connected to the common lines or the ground terminal.

In the present embodiment, the scan lines 213 are made of the first metal layer, and the data lines 214 are made of the second metal layer Thus, the second light-shielding pattern 2154 traversing the scan lines 213 has to be made of the second metal layer, and the first light-shielding pattern 2152 traversing the data lines 214 has to be made of the first metal layer. Contrarily, when the scan lines 213 in the sealant region are made of the second metal layer and the data lines 214 in the sealant region are made of the first metal layer, the second light-shielding pattern 2154 traversing the scan lines 213 in the sealant region has to be made of the first metal layer, the first light-shielding pattern 2152 traversing the data lines 214 in the sealant region has to be made of the second metal layer, and after that, the two are electrically connected via the contact hole 2162 in the first insulation layer 216.

Figure 5:
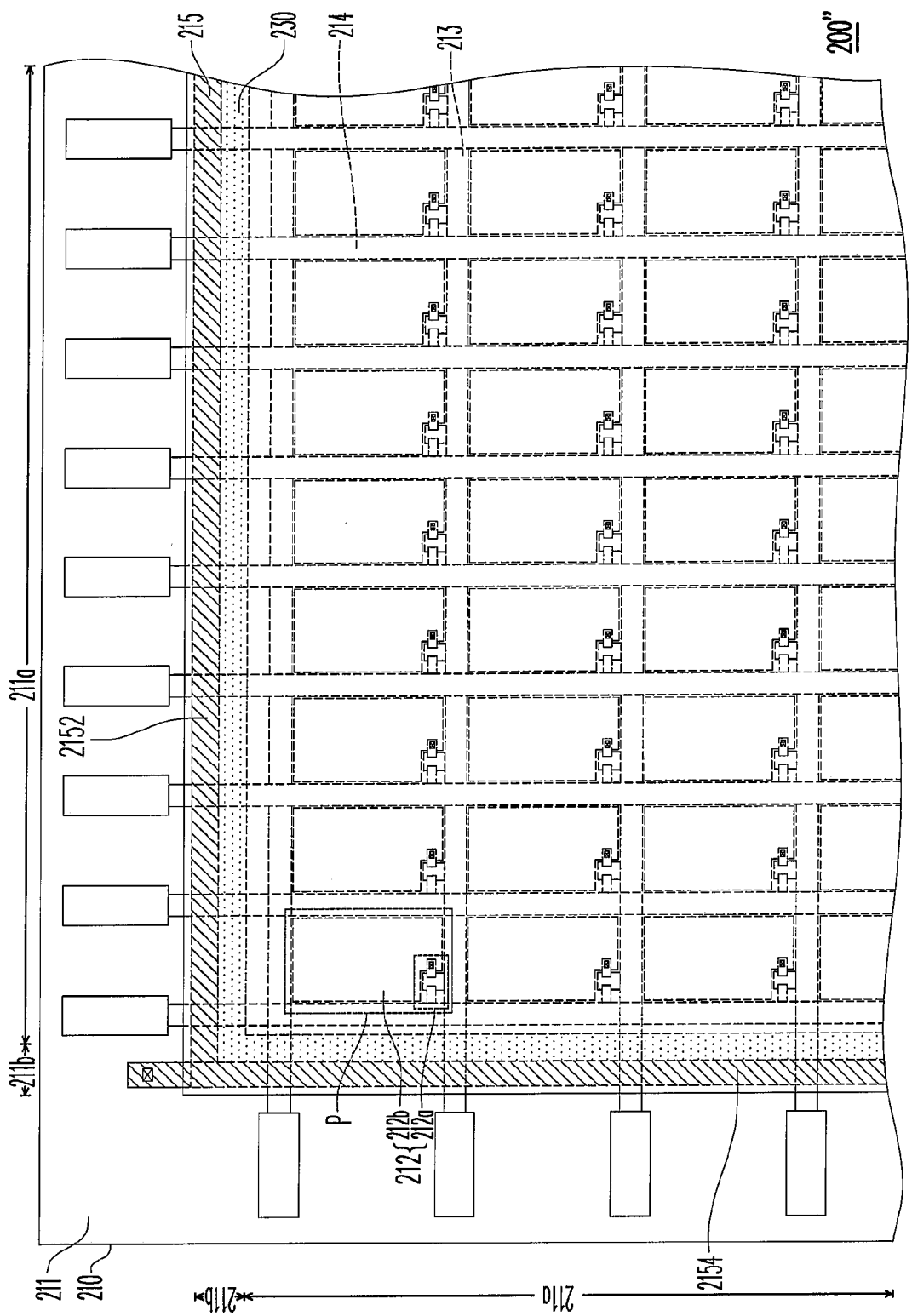
FIG. 5 is a vertical view of a LCD panel according to the third embodiment of the present invention.

FIG. 5 is a vertical view of a LCD panel according to the third embodiment of the present invention. Referring to FIG. 5, the structure of the LCD panel 200'' is approximately the same as that of the LCD panel 200' in FIG. 4A. However, the sealant 230 in the LCD panel 200'' is not located right above the light-shielding pattern 215 but is above the ESD protection circuit (not shown) at the periphery of the light-shielding pattern 215 and partially overlaps with the light-shielding pattern 215. Accordingly, the sealant 230 may be used for protecting the ESD protection circuit from being humidified, so that the reliability of the circuit can be improved. The light-shielding pattern 215 may also be used for completely replacing a black matrix to achieve light-shielding effect.

In summary, according to a LCD panel in the present invention, a light-shielding pattern is disposed on a TFT array substrate and the light-shielding pattern traverses scan lines and data lines for preventing light leakage at the periphery of the LCD panel and possible ESD damage caused by floating metals adopted in conventional techniques. Moreover, the light-shielding pattern may be electrically connected to a plurality of common lines or a ground terminal to change the voltages for adjusting capacitance coupling all together, so that ESD damage and inconsistence of capacitance coupling between signal lines can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
   a thin film transistor (TFT) array substrate, comprising:
   a substrate, having a display region and a sealant region surrounding the display region;
   a plurality of pixel structures, disposed on the display region of the substrate;
   a plurality of scan lines, disposed on the substrate;
   a plurality of data lines, disposed on the substrate, wherein the pixel structures are controlled by the scan lines and the data lines;
   a light-shielding pattern, disposed within the sealant region, wherein the light-shielding pattern traverses the scan lines and the data lines, and is electrically insulated from the scan lines and the data lines;
   a plurality of common lines, wherein the common lines and the scan lines are alternatively disposed on the substrate in parallel, and the light-shielding pattern is electrically connected to the common lines or a ground terminal;
   a color filter substrate;
   a sealant, disposed between the TFT array substrate and the color filter substrate, and being corresponding to the light-shielding pattern; and
   a liquid crystal layer, disposed between the color filter substrate, the TFT array substrate, and the sealant.

2. The LCD panel as claimed in claim 1, wherein each of the pixel structures comprises:
   a TFT, electrically connected to one of the scan lines and one of the data lines; and
   a pixel electrode, electrically connected to the TFT.

3. The LCD panel as claimed in claim 1, wherein the material of the sealant comprises an ultraviolet curing adhesive.

4. The LCD panel as claimed in claim 1, wherein the material of the light-shielding pattern comprises a metal material or a non-transparent conductive material.

5. The LCD panel as claimed in claim 1, wherein the sealant is located above the light-shielding pattern.

6. The LCD panel as claimed in claim 1, wherein the sealant partially overlaps with the light-shielding pattern.

7. The LCD panel as claimed in claim 1, wherein the light-shielding pattern comprises a first light-shielding pattern and a second light-shielding pattern, the first light-shielding pattern traverses the data lines, and the second light-shielding pattern traverses the scan lines.

8. The LCD panel as claimed in claim 7, wherein the data lines in the sealant region are located between the first light-shielding pattern and the substrate, and the TFT array substrate has an insulation layer disposed between the data lines and the first light-shielding pattern.

9. The LCD panel as claimed in claim 8, wherein the data lines within the sealant region are made of made of a first metal layer, the data lines within the display region are made of a second metal layer, and first metal layer is electrically connected to the second metal layer via a contact hole (CH) at the intersection of the sealant region and the display region.

10. The LCD panel as claimed in claim 8, wherein the scan lines are located between the second light-shielding pattern and the substrate, and the insulation layer disposed between the scan lines and the second light-shielding pattern.

11. The LCD panel as claimed in claim 7, wherein the first light-shielding pattern is located between the data lines and the substrate, and the TFT array substrate has an insulation layer disposed between the data lines and the first light-shielding pattern.

12. The LCD panel as claimed in claim 11, wherein the second light-shielding pattern is located between the scan lines in the sealant region and the substrate, and the insulation layer disposed between the scan lines and the second light-shielding pattern.

13. The LCD panel as claimed in claim 12, wherein the scan lines within the display region are made of a first metal layer, the scan lines within the sealant region are made of a second metal layer, and the first metal layer is electrically connected to the second metal layer via a contact hole at the intersection of the sealant region and the display region.

14. The LCD panel as claimed in claim 11, wherein the scan lines are located between the second light-shielding pattern and the substrate, and the insulation layer disposed between the scan lines and the second light-shielding pattern.

15. The LCD panel as claimed in claim 7, wherein the first light-shielding pattern and the second light-shielding pattern are electrically connected to the common lines.

16. The LCD panel as claimed in claim 7, wherein the first light-shielding pattern and the second light-shielding pattern are electrically connected to the ground terminal.

* * * * *